H. J. WEBB.
BUFFING MACHINE.
APPLICATION FILED SEPT. 6, 1912.
1,052,110.
Patented Feb. 4, 1913.
2 SHEETS—SHEET 2.
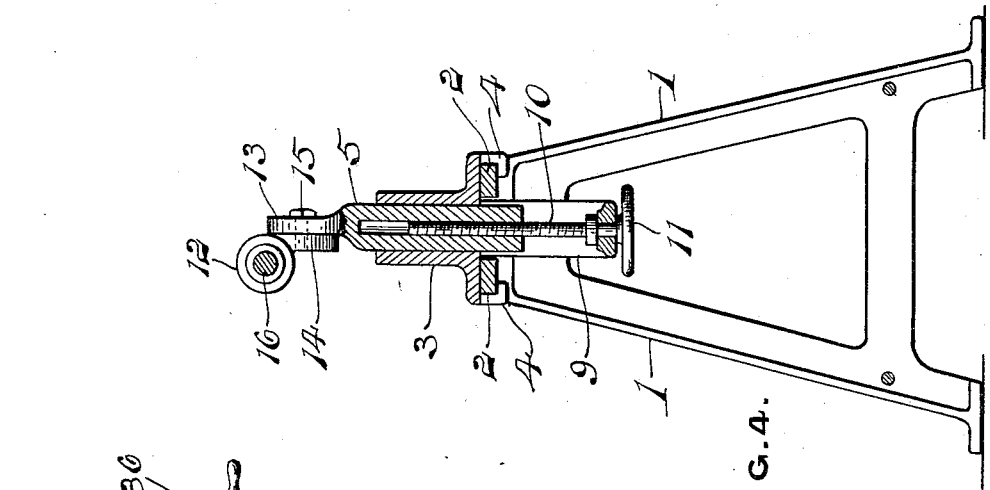
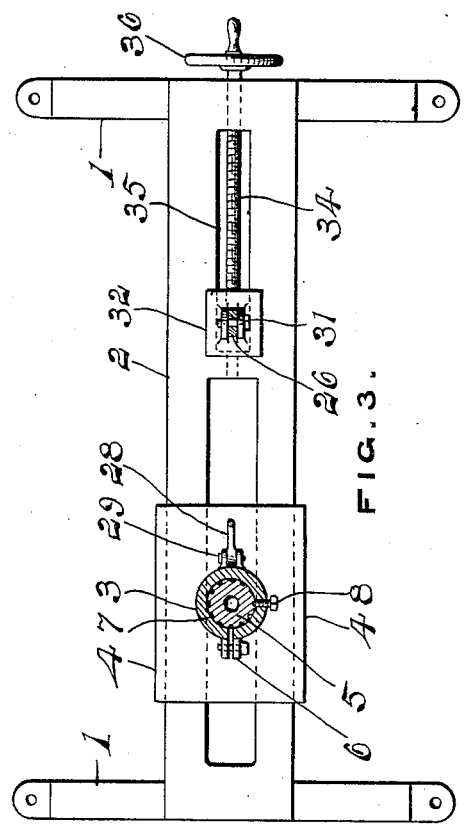
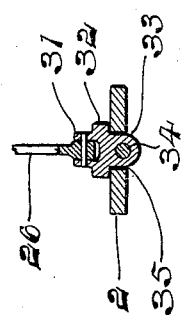
Witnesses
A. M. Shannon.
Chas. W. Stauffiger.
Inventor
Harry J. Webb
By
Attorneys

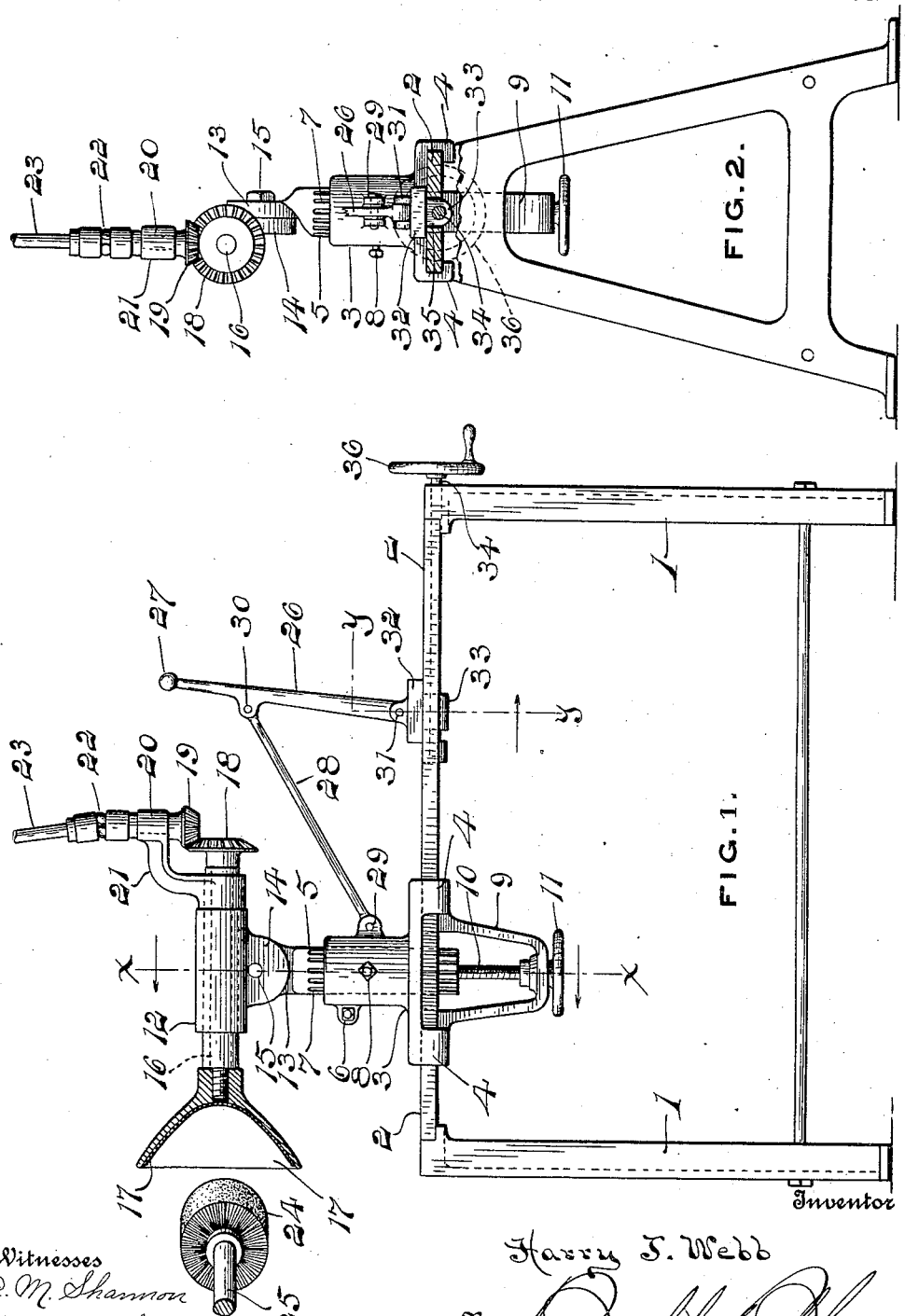

UNITED STATES PATENT OFFICE.

HARRY J. WEBB, OF DETROIT, MICHIGAN.

BUFFING-MACHINE.

1,052,110. Specification of Letters Patent. Patented Feb. 4, 1913.

Application filed September 6, 1912. Serial No. 718,815.

*To all whom it may concern:*

Be it known that I, HARRY J. WEBB, a citizen of the United States of America, residing at Detroit, in the county of Wayne and State of Michigan, have invented certain new and useful Improvements in Buffing-Machines, of which the following is a specification, reference being had therein to the accompanying drawings.
This invention relates to improvements in buffing machines and its object is to provide a simple construction having a universal adjustment and provided with simple means for moving the work into and out of engagement with the buffing wheel; and to provide certain other new and useful features in the construction and arrangement of parts all as hereinafter more fully described and particularly pointed out in the claims, reference being had to the accompanying drawings in which—

Figure 1 is a side elevation of a machine embodying the invention; Fig. 2 an end elevation of the same with parts broken away;
Fig. 3 is a sectional plan view; Fig. 4 a vertical section through the head on the line $x$—$x$ of Fig. 1; and Fig. 5 is a sectional detail on the line $y$—$y$, of Fig. 1.

As shown in the drawings 1, 1, represent suitable legs or frame for supporting a table 2 which forms a guide-way for a head 3 which is provided with grooved arms 4 engaging the side edges of the guide table 2 to hold the head in place thereon and permit it to slide freely longitudinally thereof. The head 3 forms a vertical bearing for a vertically sliding and rotatable post 5 which post may be clamped in any position to which it is adjusted by means of a clamping bolt 6 engaging ears on the bearing which is split vertically so that it may be contracted by means of the bolt into engagement with the post to clamp the same. The post is also formed with longitudinal grooves 7 adapted to be engaged by the inner end of a set screw 8 passing through the bearing so that when the post is turned in its bearing it may be held in the position to which it is turned by the engagement of the set screw with one of the grooves and these longitudinal grooves permit the vertical adjustment of the post while it is held against turning by the set screw. The lower end of the post extends downward through a longitudinal slot in the table 2 and the head 3 is provided with a downwardly extending bracket 9 forming a bearing at its lower end for an adjusting screw 10 which engages the lower end of the post and is rotated in its bearing by a hand wheel 11 to raise and lower the post which has an axial screw-threaded bore to receive the upper end of the screw shaft 10.

A bearing sleeve 12 is attached to the upper end of the post 5 by providing said post with an ear 13 engaging a like ear 14 on the sleeve and these ears are held in frictional engagement to prevent the bearing sleeve from turning upon a horizontal axis. A bolt 15 is provided in the axis of the ears which bolt may be turned to draw the ears into frictional engagement in the usual manner and hold the sleeve in any position to which it may be turned about the horizontal axis of the bolt 15. The sleeve 12 forms a suitable bearing for a mandrel 16 upon one end of which the work 17 may be secured in any suitable manner. The opposite end of this mandrel is provided with a beveled gear 18 in engagement with a gear 19 secured upon the lower end of a vertical shaft 20 mounted in a suitable bearing bracket 21 carried by the bearing sleeve 12. The shaft 20 is coupled by means of a universal joint 22 to the lower end of a drive shaft 23 which may be actuated in any suitable manner from overhead driving means.

To move the head longitudinally upon its guide-way 2 and bring the work into and out of engagement with a buffing wheel 24 which is mounted upon a shaft 25 of any suitable machine (not shown) for driving the wheel, a lever 26 is provided having a hand grip 27 at its upper end and connected by a link 28 with the head 3, said link being pivotally attached to the head at one end between ears 29 thereon, and pivotally attached at its opposite end, to an ear 30 formed intermediate the ends of the lever 26. The lower end of the lever 26 is pivoted between ears 31 on an adjustable block 32 which is provided with a downwardly extending lug 33 having a horizontal screw-threaded opening to receive a screw shaft 34 which is mounted at its ends in suitable bearings upon the table 2 and extends longitudinally thereof within a longitudinal slot 35 in the center of the table, the lug 33 extending through and freely movable in said slot. The shaft 34 is turned by means of a hand wheel 36 on its outer end and the block 32 is thus adjusted longitudinally of the table to shift the pivotal support of the lever 26 and provide for the adjustment of the head 3 along the table and the changing of the stroke of its reciprocation.

In this construction a very simple machine which is cheap to manufacture and easy to operate is provided and the mandrel may be adjusted vertically, swung upon a vertical axis or tilted upon a transverse axis to bring the work into the desired relation to the buffing wheel and after it has been so adjusted the adjustment is maintained and the work is moved into and out of engagement with the buffing wheel by a reciprocation of the head which is manually accomplished by means of a simple lever arrangement. The arrangement especially adapts this machine for use in buffing parabolic reflectors as the work may be projected over and withdrawn from the wheel with said wheel set at the proper angle to conform to the curve of the reflector.

Obviously, changes may be made in the construction and arrangement of parts without departing from the spirit of my invention and I do not limit myself to the particular form or arrangement shown.

Having thus fully described my invention what I claim is:—

1. In a buffing machine, the combination of a support, a head reciprocable upon said support, a mandrel adapted to carry work at one end thereof, means for actuating the mandrel, a bearing member for said mandrel vertically adjustable upon said head and adapted to be turned upon vertical and horizontal axes, and means for reciprocating said head.

2. In a buffing machine, the combination of a support, a head reciprocable upon said support, means for reciprocating said head, a vertically adjustable member on the head, a bearing member pivotally attached to said vertically adjustable member, a mandrel in said bearing member having a projecting end for the attachment of work thereto to rotate therewith, and means for transmitting motion to the opposite end of said mandrel to turn the same comprising a shaft and a universal joint connection.

3. In a buffing machine, the combination of a supporting frame having a guide way, a head reciprocable upon said guide way, a vertical post rotatable and vertically adjustable in said head, a bearing member attached to said post to turn upon a horizontal axis extending transversely of said bearing, a mandrel in said bearing having a projecting end for the attachment of work thereto, means for transmitting motion to the opposite end of said mandrel comprising a universal joint connection and manually operable lever mechanism for reciprocating said head.

4. In a buffing machine, the combination of a supporting frame having a guideway, a head engaging and reciprocable upon said guide way, a post rotatable and vertically adjustable in said head, means on the head for adjusting the post vertically, a bearing member pivotally attached to the upper end of the post to extend transversely thereof and to turn upon a horizontal axis extending transversely of said bearing, a mandrel in said bearing member projecting therefrom at one end to which work is adapted to be attached, means for transmitting rotary motion to said mandrel adapted to permit the universal adjustment of said bearing member, and the reciprocation of said head, a block adjustable on the frame toward and from said head, a hand lever pivotally connected to said block at one end, a link connecting said lever and head, and means for adjusting said block to change the fulcrum of said lever.

5. In a buffing machine, the combination of a supporting frame having a table forming a guide way, a head reciprocable upon said guide way, a rotatable post adjustable vertically in the head, a downwardly extending bracket on the head, a screw shaft carried by said bracket to engage and adjust said post, means for holding the post in the position to which it is turned in the head, a bearing member pivotally attached to the upper end of the post to turn upon a horizontal axis extending transversely of said member, a mandrel in said bearing member with its axis extending transversely of the axis of the post and one end projecting from said bearing member to which work is adapted to be attached, a gear on the opposite end of said mandrel, a bearing bracket on the bearing member, a shaft supported in said bearing bracket, a gear on the shaft engaging the gear on the mandrel, a power shaft, a universal joint connecting said shafts, a block slidable on said table, a screw shaft for adjusting said block longitudinally of said table, a hand lever pivotally attached to said block at its lower end, and a link pivotally connecting said lever and said head.

In testimony whereof I affix my signature in presence of two witnesses.

HARRY J. WEBB.

Witnesses:
LEWIS E. FLANDERS,
ANNA M. DORR.

---

Copies of this patent may be obtained for five cents each, by addressing the "Commissioner of Patents, Washington, D. C."